United States Patent
Wu et al.

(10) Patent No.: US 11,783,194 B1
(45) Date of Patent: Oct. 10, 2023

(54) EVOLUTIONARY DEEP LEARNING WITH EXTENDED KALMAN FILTER FOR MODELING AND DATA ASSIMILATION

(71) Applicant: Bentley Systems, Incorporated, Exton, PA (US)

(72) Inventors: Zheng Yi Wu, Watertown, CT (US); Qiao Li, Denver, CO (US); Atiqur Rahman, Fremont, CA (US)

(73) Assignee: Bentley Systems, Incorporated, Exton, PA (US)

( * ) Notice: Subject to any disclaimer, the term of this patent is extended or adjusted under 35 U.S.C. 154(b) by 904 days.

(21) Appl. No.: 16/796,462

(22) Filed: Feb. 20, 2020

(51) Int. Cl.
*G06N 3/08* (2023.01)
*G06N 3/086* (2023.01)
*G06N 3/04* (2023.01)

(52) U.S. Cl.
CPC .............. *G06N 3/086* (2013.01); *G06N 3/04* (2013.01)

(58) Field of Classification Search
None
See application file for complete search history.

(56) References Cited

U.S. PATENT DOCUMENTS 10,635,844 B1 * 4/2020 Roose ..................... G06F 30/20

OTHER PUBLICATIONS

Wu et al., Applying Deep Learning With Extended Kalman Filter and Genetic Algorithm Optimization for Water Distribution Data-Driven Modeling, CCWI 2017—Computing and Control for the Water Industry, Sheffield Sep. 5-7, 2017, Total pp. 7 (Year: 2017).*
Wu et al., Comparing Deep Learning With Statistical Control Methods for Anomaly Detection, 1st International WDSA / CCWI 2018 Joint Conference, Kingston, Ontario, Canada—Jul. 23-25, 2018; Total pp. 8 (Year: 2018).*
Liu et al., Hybrid state of charge estimation for lithium-ion battery under dynamic operating conditions, Electrical Power and Energy Systems 110 (2019); pp. 48-61 (Year: 2019).*
Behandish, M., et al., "GPU-based Artificial Neutral Network Configuration and Training for Water Distribution System Analysis," American Society of Civil Engineers, ASCE, In Proc., Annual World Environmental and Water Resources Congress, Reston, VA: ASCE, Jul. 11, 2012, pp. 1-14.
Dedinec, Alexandra, et al., "Deep Belief Network Based Electricity Load Forecasting: An Analysis of Macedonian Case," Elsevier Ltd., Energy, vol. 115, No. 3, <https://doi.org/10.1016/j.energy.2016.07.090>, Nov. 2016, pp. 1688-1700.

(Continued)

*Primary Examiner* — Alan Chen
(74) *Attorney, Agent, or Firm* — Cesari and McKenna, LLP; James A. Blanchette

(57) ABSTRACT

In example embodiments, an enhanced deep belief learning model with an extended Kalman filter (EKF) is used for training and updating a deep belief network (DBN) with new data to produce a DBN model useful in making predictions on a variety of types of datasets, including data captured from infrastructure-attached sensors describing the condition of the infrastructure. The EKF is employed to estimate operation parameters of the DBN and generate the model's output covariance. Further, in example embodiments, the configuration of the DBN model may be optimized by a competent genetic algorithm.

20 Claims, 13 Drawing Sheets

(56) References Cited

OTHER PUBLICATIONS

Elman, Jeffrey L., "Finding Structure in Time," Cognitive Science, vol. 14, No. 2, <https://doi.org/10.1207/s15516709cog1402_1.>, Mar. 1990, pp. 179-211.

Hinton, Geoffrey E., et al., "A Fast Learning Algorithm for Deep Belief Nets," Massachusetts Institute of Technology, Neural Computation., <https://doi.org/10.1162/neco.2006.18.7.1527>, vol. 18, No. 7, Jul. 2006, pp. 1527-1554.

Jin, Chenhao, et al., "Damage Detection of a Highway Bridge Under Severe Temperature Changes Using Extended Kalman Filter Trained Neural Network," Journal of Civil Structural Health Monitoring, vol. 6, No. 3, <https://doi.org/10.1007/s13349-016-0173-8.>, Jul. 2016, pp. 545-560.

Lecun, Yann, et al., "Deep Learning," Macmillan Publishers Limited, Nature, vol. 521, <https://doi.org/10.1038/nature14539.>, May 28, 2015, pp. 436-444.

Lai, Zhilu, "Moving-Window Extended Kalman Filter for Structural Damage Detection With Unknown Process and Measurement Noises," Elsevier Ltd., Measurement, vol. 88, <https://doi.org/10.1016/j.measurement.2016.04.016.>, Apr. 9, 2016, pp. 428-444.

Nair, Vinod, et al. "Rectified Linear Units Improve Restricted Boltzmann Machines," In Proceedings of the 27th International Conference on Machine Learning, Haifa, Israel, (ICML-10), Madison, WI: Omnipress, Jun. 2010, pp. 807-814.

Salman, Afan Galih, "Weather Forecasting Using Deep Learning Techniques," Elsevier Ltd., Science Direct, The Authors, Procedia Computer Science, In Proceedings of the International Conference on Advanced Computer Science and Information Systems (ICACSIS), Piscataway, NJ: IEEE, Oct. 2015, pp. 281-285.

Shi, Zhichao, et al., "Direct Interval Forecast of Uncertain Wind Power Based on Recurrent Neural Networks," IEEE, IEEE Transactions Sustainable Energy, vol. 9, No. 3, <http://doi.org/10.1109/TSTE.2017.2774195>, Jul. 2018, pp. 1177-1187.

Silver, David, et al., "Mastering the Game of Go With Deep Neural Networks and Tree Search," Macmillan Publishers Limited Nature, vol. 529, <https://doi.org/10.1038/nature16961>, Jan. 28, 2016, pp. 484-489.

Wang, H. Z., et al., "Deep Belief Network Based Deterministic and Probabilistic Wind Speed Forecasting Approach," Elsevier Ltd., Applied Energy, vol. 182, <https://doi.org/10 . 1016/j.apenergy.2016.08.108>, Aug. 25, 2016, pp. 80-93.

Wang, Huaizhi, et al., "Deep Learning Based Interval State Estimation of AC Smart Grids Against Sparse Cyber Attacks," IEEE, IEEE Transactions on Industrial Informatics, vol. 14, Issue 11, Feb. 9, 2018, pp. 1-12.

Wu, Zheng Yi, et al., 2015. "Applications of Deep Learning for Smart Water Networks," Science Direct, The Authors, Elsevier Ltd., Procedia Engineering, vol. 119, $13^{th}$ Computer Control for Water Industry Conference, CCWI 2015, <https://doi.org/10.1016/j.proeng.2015.08.870>, Dec. 2015, pp. 479-485.

Wu, Zheng Yi, et al., "Darwin Optimization User Manual," Bentley Systems, Incorporated, Watertown, CT, USA, 2012, pp. 1-40.

Wu, Zheng Yi, et al., "Optimized Deep Learning Framework for Water Distribution Data-Driven Modeling," Elsevier Ltd., ScienceDirect, Procedia Engineering, XVIII International Conference on Water Distribution Systems Analysis, WDSA 2016, vol. 186, Dec. 2017, pp. 261-268.

Wu, Zheng Yi, et al., "Parallel Artificial Neural Network Using CUDA-enabled GPU for Extracting Hydraulic Domain Knowledge of Large Water Distribution Systems," American Society of Civil Engineers ( ASCE), In Proceedings of the World Environmental and Water Resources Congress 2011, Palms Springs, California, USA, Bearing Knowledge for Sustainability, Reston, VA: ASCE, May 22-26, 2011, pp. 79-92.

Yang, Hao-Fan, "Optimized Structure of the Traffic Flow Forecasting Model With a Deep Learning Approach," IEEE, IEEE Transactions on Neural Networks and Learning Systems, vol. 28, No. 10, <https://doi .org/10.1109/TNNLS.2016.2574840.>, Oct. 2017, pp. 2371-2381.

Zhang, Qin, "Prediction of Sea Surface Temperature Using Long Short-Term Memory," IEEE, IEEE Geoscience and Remote Sensing Letters, vol. 14, No. 10, <https://doi.org/10 .1109/LGRS.2017.2733548>, May 2017, pp. 1745-1749.

Zhang, Yongzhi, et al. "Long Short-Term Memory Recurrent Neural Network for Remaining Useful Life Prediction of Lithium-Ion Batteries," IEEE, IEEE Transactions on Vehicular Technology, vol. 67, No. 7, <https:// doi.org/10.1109/TVT.2018.2805189.>, Jul. 2018, pp. 5695-5705.

\* cited by examiner

EVOLUTIONARY DEEP LEARNING WITH EXTENDED KALMAN FILTER FOR MODELING AND DATA ASSIMILATION

BACKGROUND

Technical Field

The present disclosure relates generally to data analytics and more specifically to techniques for training and assimilating artificial neural network models for use in data analytics.

Background Information

Infrastructure (e.g., transportation networks, utility networks, civil engineering structures, etc.)) is the foundation of modern society as it provides transportation, power generation, safe drinking water, and much more. To be sustainable for long-term economic development, infrastructure should be resilient to incidents and deteriorations. The resiliency of infrastructure may be enhanced by monitoring its condition and addressing issues in a timely manner. To this end, a variety of sensor systems have been developed that continuously capture data describing the condition of the infrastructure, and use such data to extract actionable information (e.g., information predicting components that should be repaired, replaced, adjusted, etc.) Such systems may employ a variety of types of infrastructure-attached sensors, such as strain gauges, inclinometers, linear position sensors, water flow sensors, water quality sensors, power consumption sensors, etc. that produce large volumes of data describing the condition of the infrastructure. From this large volume of data, various data analytics may be applied to extract actionable information.

Various data analytics techniques have been developed in recent decades, but such existing techniques typically lack the robustness and data assimilation features required to yield accurate results in these types of applications. Some data analytics techniques utilize machine learning based on artificial neural network (ANNs). An ANN is constructed from a collection of connected units or nodes called artificial neurons, whose operation loosely approximates the operation of neurons in a biological brain. Each connection (or "edge") between artificial neurons can transmit a signal. The output of each artificial neuron on an edge is a non-linear function of its inputs. Artificial neurons and edges typically have a weight that is adjusted as learning proceeds. Thresholds are typically used, such that an artificial neuron sends a signal only if the aggregate signal received by it crosses the threshold. Typically, artificial neurons are aggregated into groups referred to as "layers", and different layers perform different transformations on their inputs. Typically, artificial neurons of one layer connect only to artificial neurons of the immediately preceding and immediately following layers. The layer that receives external data is typically referred to as the "input" layer, while the layer that produces the ultimate result is typically referred to as the "output" layer. In between the input layer and the output layer are typically zero or more "hidden" layers. ANNs may be defined by parameters that define their configuration referred to as "hyperparameters". Examples of hyperparameters include learning rate, the number of hidden layers, and the number of neurons in each layer, among other configuration details. An ANN is trained by adjusting weights (and optionally thresholds) to improve the accuracy of results. This is often done by minimizing observed errors via a cost function. Backpropagation (BP) is a known method to adjust weights to compensate for errors found during training. An ANN configured and trained for use with particular datasets may be referred to as a "model". Among other uses an ANN model may be used to make predictions on new datasets.

Training a traditional ANN with many hidden layers presents challenges which have in the past hindered their use in predictive applications. These challenges include the "vanishing gradient problem" and the "explaining away phenomenon", the details of which are well known in the field. To address some of these challenges, a technique referred to as "deep learning" ("DL") was developed. DL was a major breakthrough that enabled the effective training of ANNs with many hidden layers to produce a model referred to as a "deep belief network" ("DBN") model. In DL, each layer learns to transform its input into a slightly more abstract and composite representation. Importantly, using DL the DBN can learn which features to optimally place in which layer.

DL has enabled DBN models to be used in making predictions on a variety of types of datasets, including data captured from infrastructure-attached sensors describing the condition of the infrastructure. However, a number of technical challenges are still present which have hindered the widespread deployment of DBN models in data analytics in the infrastructure space, and other areas of technology. Training DBNs with existing techniques is very time consuming, given typically available hardware resources (e.g., processing and memory resources). Further, prediction results from DBN models typically become less-and-less accurate over time. The DBN is typically fixed once the model is trained. Yet errors between the DBN model and the actual system are propagated and compound over time. Frequently updating the DBN model with additional training could address this issue and maintain accurate prediction. However, as mentioned above, with existing techniques training is extremely time consuming given typical hardware resources, and thereby frequent updating is not practical for many types of applications, for example, applications that involve fast-changing data, which may be common in the infrastructure space (e.g., rapidly-sampled power consumption data of an electrical network).

Further, the configuration of a DBN (e.g., learning rate, number of hidden layers, number of neurons in each layer, etc.) defined by the hyperparameters may have a great impact on DBN model performance. To provide good predictive accuracy, effective hyperparameters should be adopted for the particular dataset at hand. However, there are few general rules for choosing optimal hyperparameters for a given dataset. As a result, manual trial-and-error approaches are often employed to try to find a combination that provides acceptable results. Such manual trial-and-error may be time consuming, and may not always result in an optimal configuration.

Accordingly, there is a need for improved techniques to enable artificial neural network models to be more useful in data analytics, including data analytics of infrastructure health data, among other types of data.

SUMMARY

In example embodiments, an enhanced deep belief learning model with extended Kalman filter (EKF) is used for training and updating a DBN to produce a DBN model useful in making predictions on a variety of types of datasets, including data captured from infrastructure-attached sensors describing the condition of the infrastructure.

The EKF is employed to estimate operation parameters of the DBN and generate the model's output covariance. Among other benefits, the EKF may enable quick training and updating given typical hardware resources (e.g., processing and memory resources), being well suited for fast-changing data. The EKF may also be suited for computing a confidence interval of a prediction, and thus upper and lower bounds can be generated for each prediction and used to determine outliers. Further, in example embodiments, the configuration of the DBN model may be optimized by a competent genetic algorithm, avoiding manual trial-and-error approaches. The competent genetic algorithm may efficiently determine hyperparameters that optimize prediction accuracy.

In one specific embodiment, an integrated deep learning framework receives in its user interface input specifying at least a training dataset. The framework trains the DBN model using the training dataset, where the training includes fine-tuning the DBN model using an EKF to estimate operation parameters of the DBN model. The integrated deep learning framework applies the trained DBN model to a current dataset to make predictions, while simultaneously assimilating data of the current dataset with the predictions using the EKF to update the DBN model. An indication of the predictions for the current dataset may be displayed in the user interface.

In another specific embodiment, an integrated deep learning framework receives in its user interface input specifying at least a training dataset. The integrated deep learning framework uses a competent genetic algorithm to generate a candidate DBN configuration and operation parameters. The candidate DBN configuration and operation parameters are used to train the DBN model. The competent genetic algorithm treats an error determined by a cost function used in the training as a fitness score, and repeats the operations to produce subsequent candidate DBN configuration and operation parameters until the fitness score meets a threshold or another termination condition is met. The resulting configuration and operation parameters are then used for the DBN model. The integrated deep learning framework applies the trained DBN model to a current dataset to make predictions. An indication of the predictions for the current dataset may be displayed in the user interface.

It should be understood that a variety of additional features and alternative embodiments may be implemented other than those discussed in this Summary. This Summary is intended simply as a brief introduction to the reader for the further description that follows, and does not indicate or imply that the examples mentioned herein cover all aspects of the disclosure, or are necessary or essential aspects of the disclosure.

BRIEF DESCRIPTION OF THE DRAWINGS

The description refers to the accompanying drawings of example embodiments, of which.

DETAILED DESCRIPTION

Figure 1:
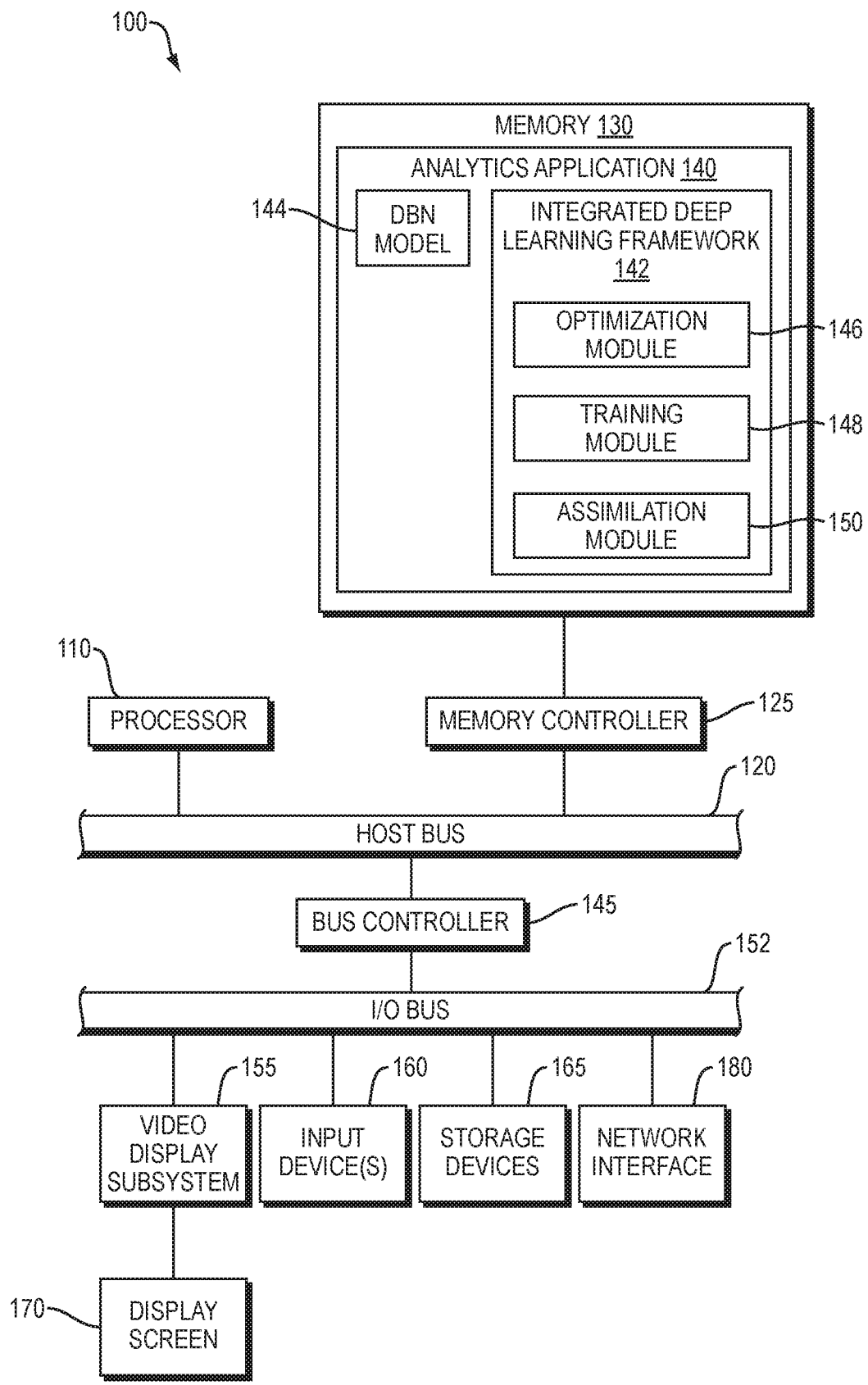
FIG. 1 is a block diagram of an example electronic device (e.g., a computer) that may be used with the present techniques.

FIG. 1 is a block diagram of an example electronic device 100 (e.g., a computer) that may be used with the present techniques. The electronic device 100 includes at least one processor 110 coupled to a host bus 120. The processor 110 may be any of a variety of commercially available processors, such as an Intel x86 processor, or another type of processor. A volatile memory 130, such as a Random Access Memory (RAM) is also coupled to the host bus via a memory controller 125. When in operation, the memory 130 stores software (i.e. processor-executable instructions) and data that are provided to the processor 110. An input/output (I/O) bus 152 is coupled to the host bust 120 via a bus controller 145. A variety of additional components are coupled to the I/O bus 152. For example, a video display subsystem 155 is coupled to the I/O bus 152. The video display subsystem may include a display screen 170 and hardware to drive the display screen. At least one input device 160, such as a keyboard, a touch sensor, a touchpad, a mouse, etc., is also coupled to the I/O bus. A persistent storage device 165, such as a hard disk drive, a solid-state drive, or another type of persistent data store, is further attached, and persistently stores processor-executable instructions and data, that are loaded into the memory 130 when needed. Still further, a network interface 180 is coupled to the I/O bus 152. The network interface enables communication over a computer network, such as the Internet, between the electronic device 100 and other devices, using any of a number of well-known networking protocols. Such communication may enable collaborative, distributed, or remote computing with functionality (including the functionality discussed below) spread across multiple electronic devices.

Working together, the components of the electronic device 100 (and other electronic devices in the case of collaborative, distributed, or remote computing) may execute a number of different software applications. For example, the memory 130 may store at least a portion of software for an analytics application 140 used to making predictions on datasets that, for example, include data captured from infrastructure-attached sensors (e.g., strain gauges, inclinometers, linear position sensors, water flow sensors, water quality sensors, power consumption sensors, etc.) describing the condition of infrastructure (e.g., transportation networks, utility networks, civil engineering structures, etc.). The analytics application 140 may include an integrated deep learning framework 142 that, as discussed in more detail below utilizes a number of software modules, such as an optimization module 146, a training module 148 and an assimilation module 150, to produce a DBN model 144.

Figure 2:
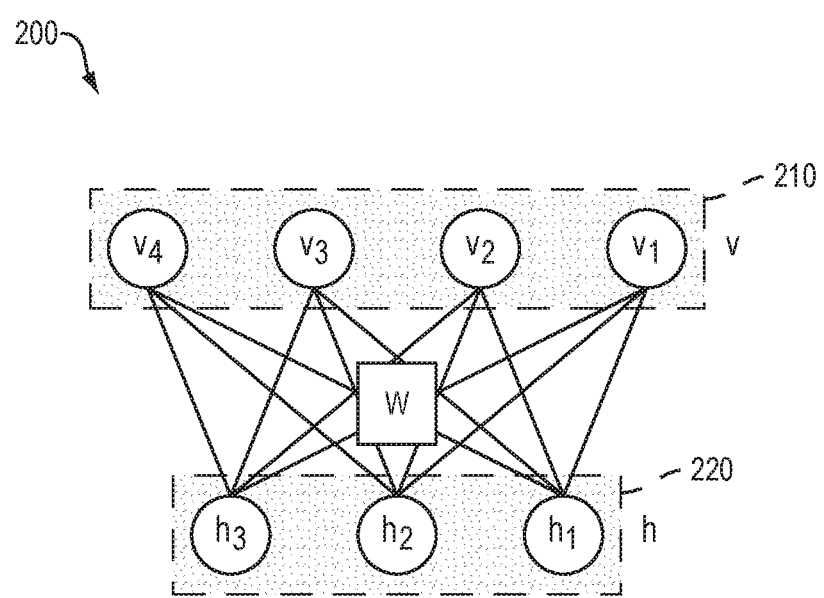
FIG. 2 is a block diagram of an example restricted Boltzman machines (RBM)

The DBN model 144 may be constructed by stacking a number of restricted Boltzman machines (RBMs) and training them in a greedy layer manner. FIG. 2 is a block diagram of an example RBM 200. An RBM is a fully connected bipartite graph, with two layers, namely a visible layer 210 and a hidden layer 220. The artificial neurons in the visible and hidden layers are designed to take binary or Gaussian values as input, so that several different value types, namely binary-binary, Gaussian-binary or Gaussian-Gaussian, may be received.

Based on the RBM, the DBN model's conditional probability distribution between observed vectors and hidden layers may be given as:

$$P(x, h^1, h^2, \ldots, h^l) = \left(\prod_{k=0}^{l-2} P(h^k|h^{k+1})\right) P(h^{l-1}, h^l) \quad (1)$$

where x corresponds to the input layer and is equivalent to $h^0$, and $P(h^{l-1},h^l)$ is a joint probability distribution of visible units of a RBM at layer l conditioned on the hidden units of the RBM at layer l–1.

Figure 3:
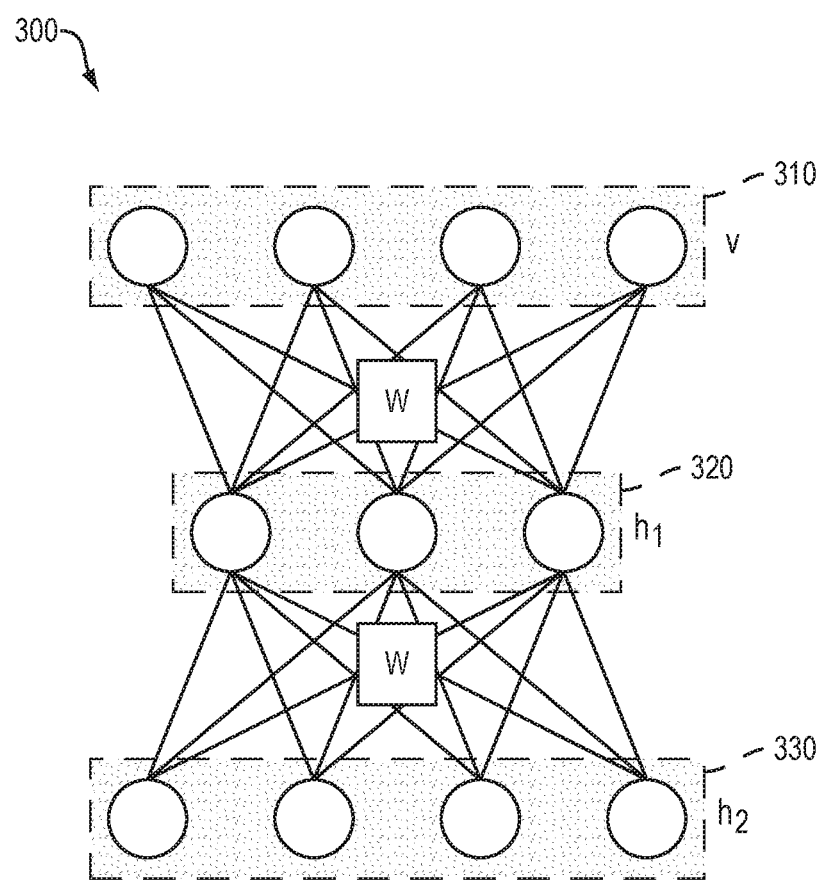
FIG. 3 is a block diagram of an example DBN model formed by stacking a number of RBMs (here two RBMs) to have a visible layer and two hidden layers.

FIG. 3 is a block diagram of an example DBN model 300 formed by stacking a number of RMBs (here two RBMs) to have a visible layer 310 and two hidden layers 320, 330. For a predictive application, a Gaussian-binary RBM may be implemented with an energy function given as:

$$E(v, h) = -\sum_{i \in V} \frac{(v_i - a_i)^2}{2\sigma_i^2} - \sum_{j \in H} b_j h_j - \sum_{i,j} \frac{v_i}{\sigma_i} h_j w_{ij} \quad (2)$$

where V is the set of artificial neurons in the visible layers, H is the set of artificial neurons in the hidden layers, $v_i$ and $h_j$ are states of visible and hidden units, respectively, $a_i$ is bias weight for the visible units, $b_j$ denotes hidden units, $w_{ij}$ is weights between artificial neuron I and artificial neuron j, and $\sigma_i$ is standard deviation of the Gaussian noise for visible unit i. Learning the noise associated with each visible unit may be addressed by normalizing each component of the dataset through subtracting the mean and dividing by the variance. The learning rate may be reduced from that typical in binary-binary RBM training to keep the weights emanating from certain components from becoming very large. Gaussian visible units with rectified linear hidden units may be used in a Gaussian-binary RBM. The hidden units may be approximated by the function max(0, N(0,1)), where N(0,1) is a Gaussian noise with zero mean and unit variance.

Figure 4A:
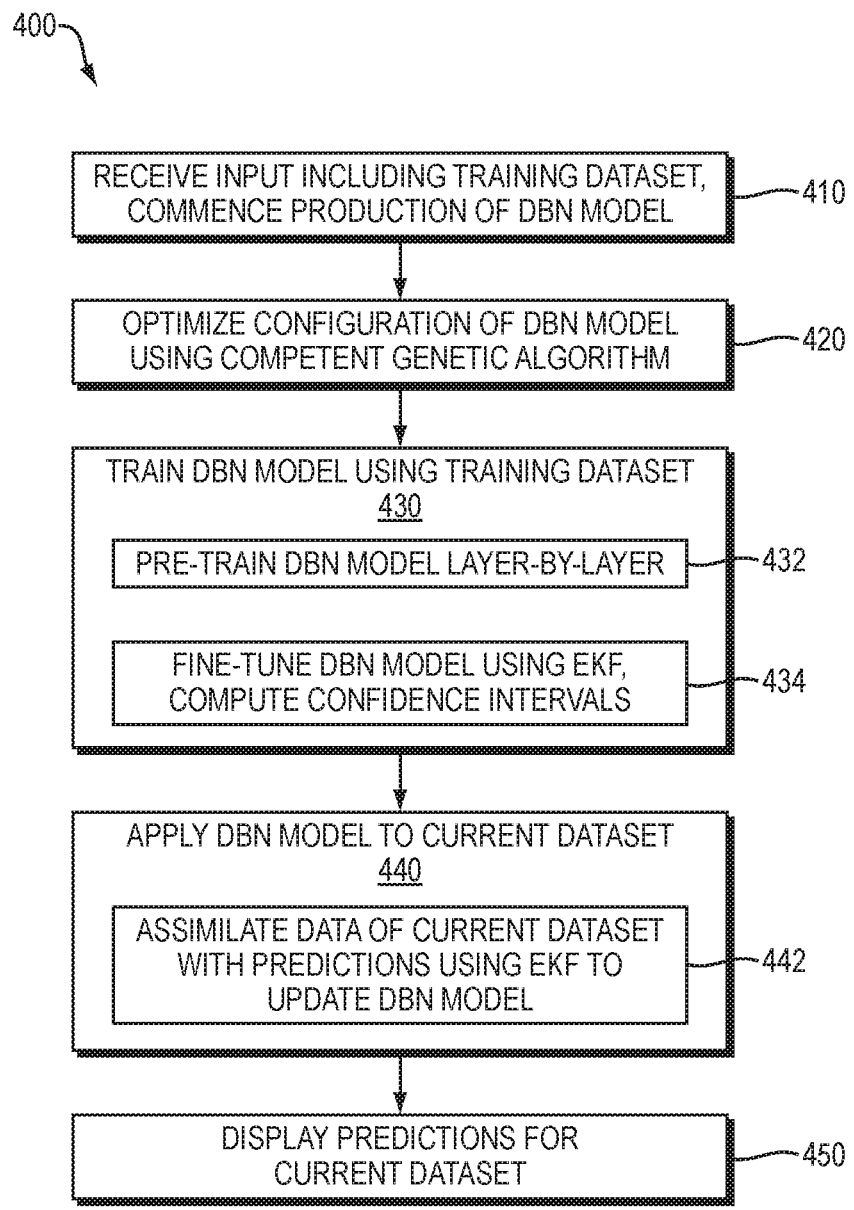
FIG. 4A is a flow diagram of an example high level sequence of steps that may be executed by modules of an integrated deep learning framework to configure, train and update a DBN model.
Figure 4B:
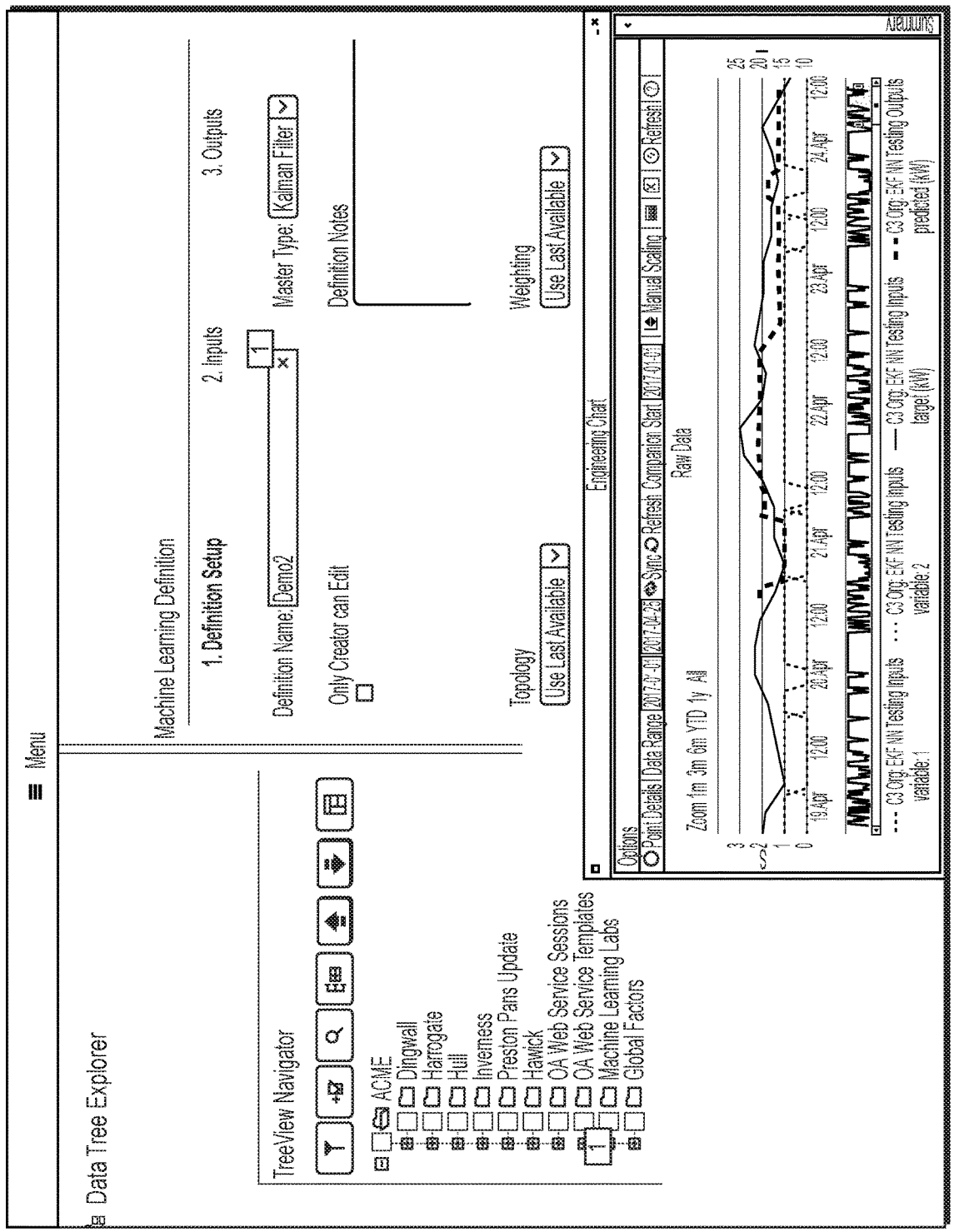
FIG. 4B is a screen shot of an example user interface of the integrated deep learning framework.

The integrated deep learning framework 142 may produce a DBN model 144 that is predictive for given data (e.g., data captured from infrastructure-attached sensors describing the condition of infrastructure) to enable data analytics. To achieve this, the optimization module 146, training module 148 and assimilation module 150 may act in concert to configure, train and update the DBN model 144. FIG. 4A is a flow diagram of an example high level sequence of steps 400 that may be executed by the modules 146-150 of the integrated deep learning framework 142 to configure, train and update a DBN model 144. At step 410, in response to input in a user interface of the integrated deep learning framework 142, production of a DBN model 144 is commenced. As part of the input, a user may specify certain qualities of the DBN model and data sources, such as a training dataset, to use in producing the DBN model 144. FIG. 4B is a screen shot 490 of an example user interface of the integrated deep learning framework 142.

At step 420, the optimization module 146 utilizes a competent genetic algorithm to optimize configuration (e.g., learning rate, number of hidden layers, number of neurons in each layer, etc.) of the DBN model 144. In one embodiment, the competent genetic algorithm may take the form of a fast messy Genetic Algorithm (fmGA), such as that provided by the Darwin™ Optimization Framework available from Bentley Systems. The competent genetic algorithm determines effective hyperparameters that provide the optimized configuration. At step 430, parts of which may occur simultaneously with the optimization of step 420, the training module 148 trains the DBN model 144 utilizing a training dataset (e.g., a dataset of historical data captured from infrastructure-attached sensors describing the past condition of the infrastructure). The training step 430 may include two sub-steps: a pre-training sub-step 432 and a fine-tuning sub-step 434. In the pre-training sub-step 432, the DBN is trained layer-by-layer, so that the front layers can be well trained. In the fine-tuning sub-step 424 the DBN is fine-tuned using an EKF and confidence intervals computed. After the DBN model is trained, it is ready to be used for prediction. At step 440, the framework 142 applies the DBN model 144 to a current dataset (e.g., a dataset of data currently captured from infrastructure-attached sensors describing the current condition of the infrastructure) to make predictions. When making predictions, those that fall outside of a confidence interval computed by the EKF may be considered outliers and ignored. As part of such operation, at sub-step 442, the assimilation module 148 assimilates data of the dataset with the predictions to continuously update the DBN model 144. Also, at sub-step 444, the assimilation module 148 uses the EKF to update the confidence interval based on the dataset. In this manner, the updated DBN model may continue to make accurate predictions for new data while the updated confidence interval maintains accurate outlier determination. At step 450, which may occur simultaneously to step 440, a user interface of the deep learning framework 142, such as the example user interface 490 shown in FIG. 4B may display predictions for the current dataset to a user (e.g., to enable to the user to proactively repair, replace, adjust, etc. components of the infrastructure). The display of predictions may take any of a variety of forms, including indicia such as tables, graphs, warning messages, graphical indicators, and the like.

Figure 5:
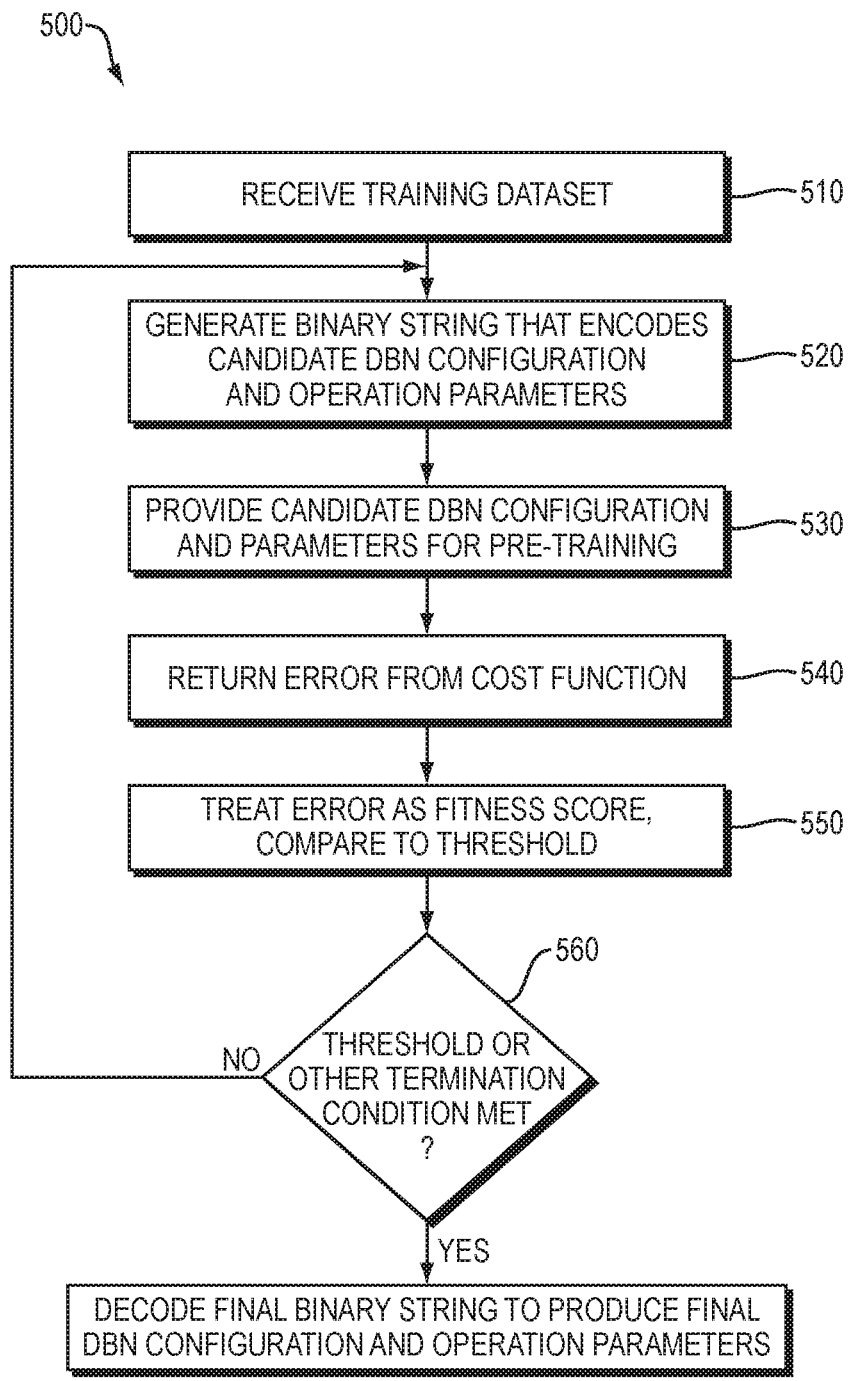
FIG. 5 is a flow diagram of an example sequence of steps expanding upon the operation of an optimization module in a step of FIG. 4A.

Looking to the steps of FIG. 4A in more detail, FIG. 5 is a flow diagram of an example sequence of steps 500 expanding upon the operation of the optimization module 146 step 420. At step 510, the optimization module 146 receives a training dataset (e.g., a dataset of historical data captured from infrastructure-attached sensors describing the past condition of the infrastructure) that includes input data U and output data Y. At step 520 a competent genetic algorithm of the optimization module 146 generates a binary string that encodes a candidate DBN configuration and operation parameters. The DBN configuration may be described using a number of hyperparameters that specify learning rate, the number of hidden layers, number of neurons in each layer, etc. At step 530, the candidate DBN configuration and operation parameters from the binary string are provided to the training module 148, which as part of the pre-training discussed below, trains the DBN layer-by-layer. At step 540, the training module 148 returns an error produced by a cost function. At step 550, the competent genetic algorithm of the optimization module 146 treats the error as a fitness score and compares the fitness score to a threshold. At step 560, if the threshold or another termination condition is not met, execution loops back to step 520 and a successive binary string that encodes a new candidate DBN configuration and operation parameters is generated. The process loops over and over such that successive generations of binary strings are generated until the threshold or another termination condition is met and a final binary string is produced. Then, at step 570, the final binary string is decoded into a final DBN configuration and operation parameters that are returned, for use in fine-tuning and other operations.

Returning to FIG. 4A, looking to the operation of the training step 430 in more detail, as mentioned above, the training step 430 includes a pre-training sub-step 432 and a fine-tuning sub-step 434. Due to the vanishing gradient problem and explaining-away phenomenon, a DBN cannot be trained effectively with traditional gradient-based training methods alone. Pre-training utilizes the training dataset and an unsupervised learning algorithm that treats the DBN layer-by-layer. The learning algorithm treats the values of latent variables in one layer, when they are being inferred from the training data, as the data for training the next layer. Each layer learns a non-linear transformation of its inputs (e.g., the output of the previous layer) that captures the main variations in its input.

Figure 6:
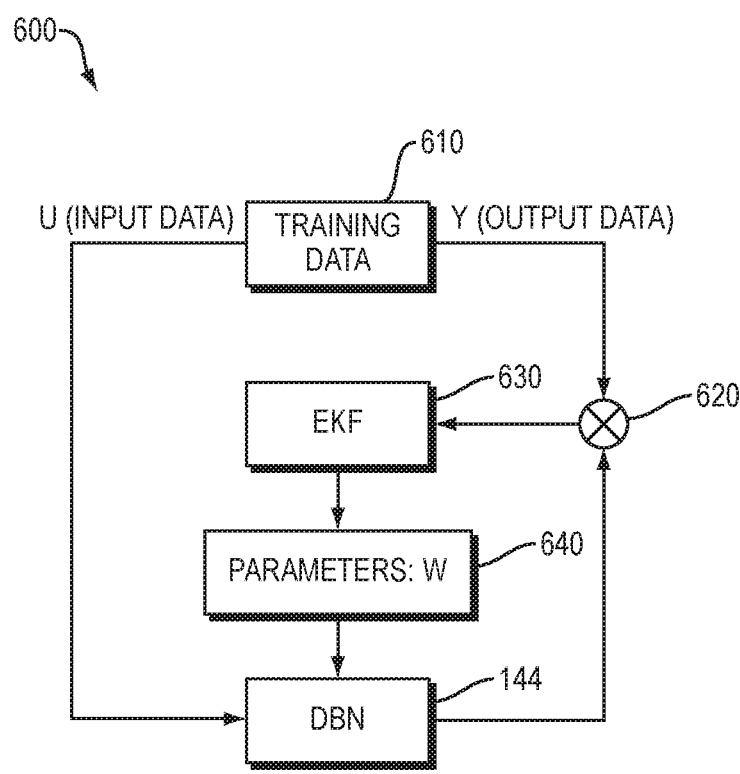
FIG. 6 is a diagram illustrating an example of fine-tuning a pre-trained DBN using an EKF.

The pre-trained DBN is fine-tuned for prediction using an EKF. FIG. 6 is a diagram 600 illustrating and example of fine-tuning a pre-trained DBN using an EKF. To fine-tune for prediction, a first portion of the input data U of the training dataset (e.g., 80% of the input data U of the training dataset) 610 is provided to the DBN model 144. The prediction produced by the DBN 144 is then compared by a function 620 with a corresponding first portion of the output data Y of the training dataset (e.g., 80% of the output data Y of the training dataset). If the output data and the prediction produced by the DBN model 144 are the same or have a very small difference (e.g., as measured by a threshold difference), the DBN model prediction is concluded to be accurate, and operation parameters (i.e. weights and/or biases) 640 of the DBN model 144 maintained the same. Otherwise, the difference from the comparison function 620 is fed back to the EKF 630 to adjust the operation parameters 640 of the DBN model 144.

A second portion of the input data Y and output data U of the training dataset (e.g., 20% of the input data Y and output data U of the training dataset) 610 may be used for validation to ensure that a robust DBN model 144 is obtained. Validation is often used in combination with retraining to obtain better results. Retraining is particularly useful when the training dataset 610 is not be large enough for the operation parameters (i.e. weights and/or biases) of the DBN 144 to converge to the optimal values in one iteration of fine-tuning. In retraining, the DBN model 144 is fine-tuned with the first portion of the input data Y and output data U of the training dataset and then the trained DBN model 144 is validated with the second portion of the input data Y and output data U of the training dataset. The fine-tuning and validating repeats, until the training module 148 detects the DBN model 144 exhibit signs of being overfitted. One sign of overfitting that may be monitored is the root-mean squared error (RMSE) produced in validation diverging from the RMSE of training.

Figure 7:
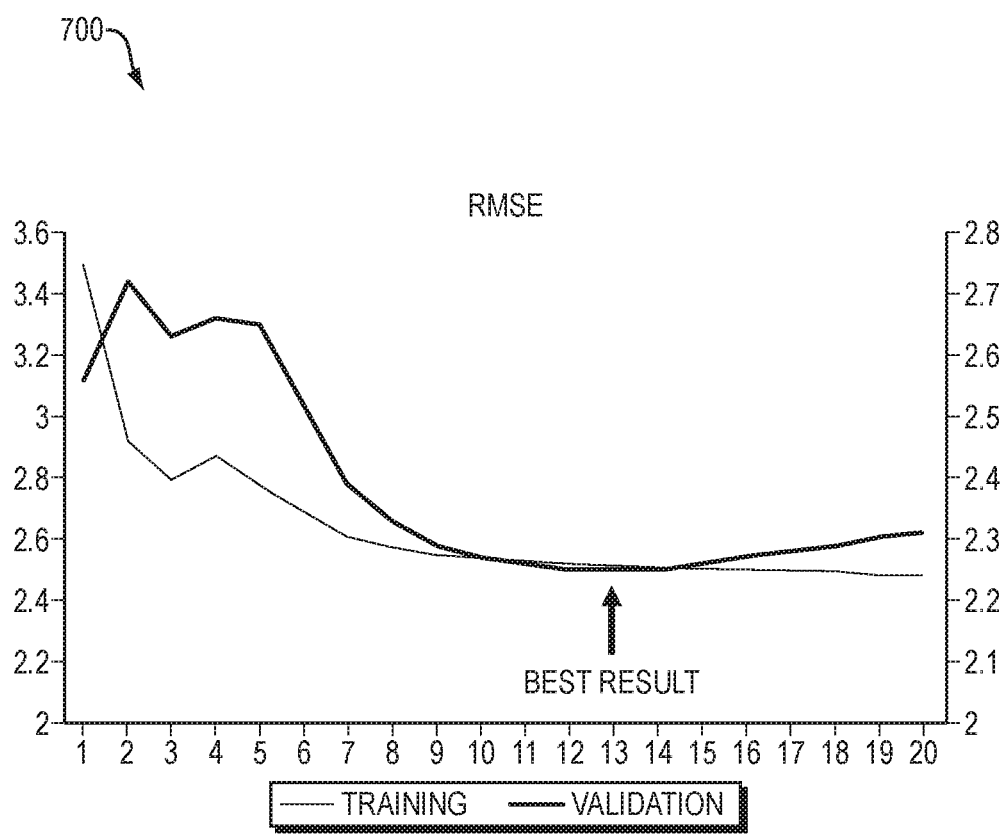
FIG. 7 is a graph showing an example of retraining and overfitting.

FIG. 7 is a graph 700 showing an example of retraining and overfitting. The horizontal axis denotes the number of retainings of the DBN model 144. In this example, the RMSE of validation increases after the 14$^{th}$ retraining, while the RMSE of the training continued to decrease. This means that the DBN model 144 was overfitted after the 13$^{th}$ retraining, and therefore the 13$^{th}$ retraining should be chosen as the trained DBN model 144 to avoid this issue.

After the DBN model 144 is pre-trained and fine-tuned by EKF, it is ready to be used for prediction on a current dataset (e.g., a dataset of data currently captured from infrastructure-attached sensors describing the current condition of the infrastructure). Simultaneous to such operation, the assimilation module 148 assimilates data of the current dataset with the predictions to continuously update the operation parameters of the DBN model and the confidence interval with new inputs. Such update ensures the DBN model 144 keeps tracking the changes of the real system (e.g., the infrastructure), and the accuracy of the outlier detection is maintained. When an EKF is used, a confidence interval can be calculated by a prediction covariance obtained from an error covariance matrix used with the EKF. The diagonal elements of the matrix are the covariance of the prediction. The confidence interval defines the upper and lower bounds between which a value is expected to appear.

Figure 8:
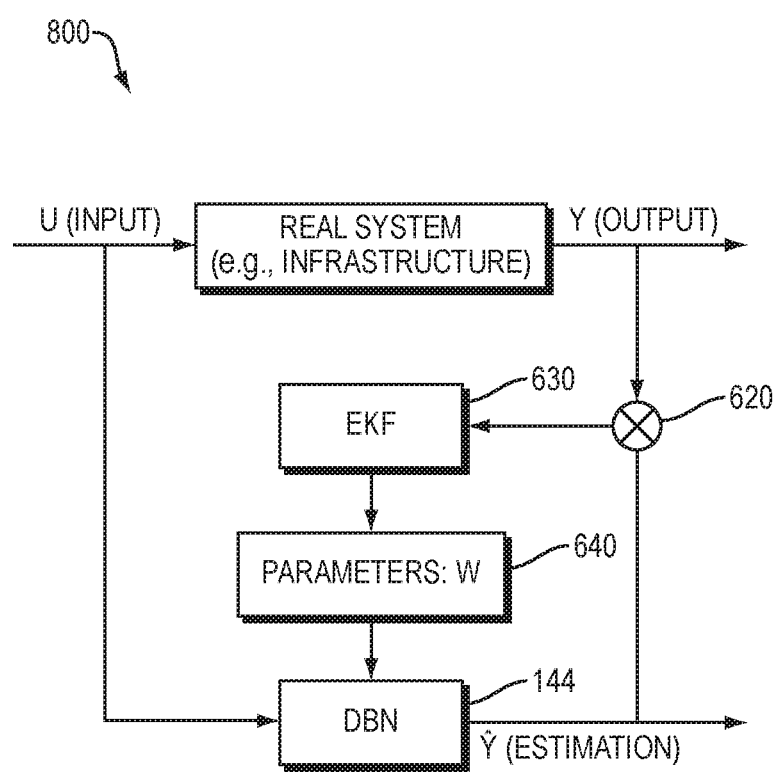
FIG. 8 is a diagram illustrating an example of assimilating a DBN using an EKF.

FIG. 8 is a diagram 800 illustrating an example of assimilating a DBN using an EKF. During prediction, a dataset 810 including the input data U and the output data Y of the real system (e.g., as captured by infrastructure-attached sensors) is provided as new data to the DBN model 144. The prediction produced by the DBN model 144 is then compared by a function 620 with the output data Y from the real system (e.g., from infrastructure-attached sensors) and the results of such comparison are used to update operation parameters (i.e. weights and/or biases), so that the DBN model 144 can learn features in the new data 810. Due to the efficiency of the EKF, such assimilation can occur substantially in real-time, avoiding the need to pause prediction and undergo a dedicated retraining operation.

To apply an EKF to train and update a DBN model 144 for a given dataset, a general formulation is derived for many-layer DBNs. Suppose the neural network can be modeled as a predictive system described by:

$$W(t)=W(t-1)+\varepsilon(t) \tag{3}$$

$$Y(t)=h(W(t),U(t)+v(t) \tag{3}$$

where W(t) is a vector of states at time t, containing the weights and biases of the DBN, U(t) and Y(t) are input and output vectors, respectively, $\varepsilon(t)$ is process noise, v(t) is observation noise (or measurement noise), and h(W(t),U(t)) is generally an observation function. Because h(W(t),U(t)) is a nonlinear function, the EKF is desired for improving the DBN, because a conventional Kalman filter is designed for linear systems.

For the model given by equations (3) and (4), the EKF is formulated in two sets of equations, including the prediction equations:

$$\hat{W}(k)=W(k) \tag{5}$$

$$\hat{Y}(k)=h(\hat{W}(k),U(k)) \tag{6}$$

and the update equations $$S(k+1)=H(k+1)P(k)H(k+1)^T+R(k+1) \quad (7)$$

$$K(k+1)=P(k)H(k+1)^T S(k+1)^{-1} \quad (8)$$

$$P(k+1)=P(k)-K(k+1)H(k+1)P(k) \quad (9)$$

$$\hat{W}(k+1)=\hat{W}(k)-K(k+1)(Y(k)-\hat{Y}(k)) \quad (10)$$

Due to the nature of the EKF as an iterative algorithm the proceeding equations are in a discrete form, and L is the index of the iterations. To train or update the neural network with an EKF, the matrixes R and H in equations (7)-(9) are calculated in every iteration.

The matrix R denotes the measurement covariance and can be obtained, for example, based on the precision of the infrastructure-attached sensors. However, if no information is available about the precision of the infrastructure-attached sensors, the measurement covariance may be estimated using a moving window method with the measured data.

The Jacobian matrix H is defined as the partial derivative of the observation function h(W(t), U(t)) with respect to W(t) at the weights $\hat{W}$(t), as shown in:

$$H = \frac{\partial h(W(t), U(t))}{\partial W(t)}\bigg|_{\hat{W}(t)} \quad (11)$$

Because the observation function h(W(t), U(t)) of the neural network is distinct for different configurations, the function h(W(t), U(t)) does not have uniformity. The Jacobian matrix H may be calculated by an algorithm recursively. With this algorithm, the EKF can be integrated with the neural network to train and update the neural network model.

A DBN is more powerful at extracting pattern data than a conventional artificial neural network with only a few layers. However, the layers of a DBN lead to its observation function h(W(t), U(t)) being a highly nonlinear and complex nested structure. A generalized algorithm may be used for calculating the H matrix of the EKF for a DBN.

Figure 9:
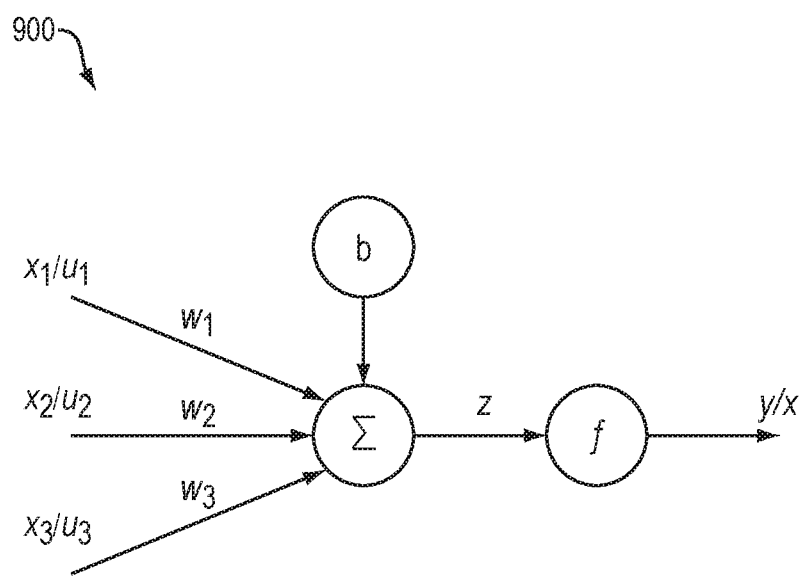
FIG. 9 is a diagram of an example artificial neuron.

FIG. 9 is a diagram 900 of an example artificial neuron. The mathematical model of the neuron in FIG. 9 can be represented as:

$$y = sig(\Sigma w_i x_i + b) \quad (12)$$

where $w_i$ is the weight of the neuron, $x_i$ or $u_i$ is inputs of the neuron, b is bias, z is weighted sum of the inputs and bias, i.e., $z=\Sigma w_i x_i + b$, f is a nonlinear activation function, usually the sigmoid function $sig(z)=1/(1+e^{-z})$ and y is output. According to the model of the neuron in equation (12) and FIG. 9, the bias b can be treated as a weight of a constant input, as:

$$y = sig(\Sigma w_i x_i + w_0 x_0) \quad (13)$$

where $w_o = b$ and $x_o = 1$. Therefore, the bias b is included in the weight vector W(t) in equation (5) and can be trained by the EKF as a weight.

Figure 10:
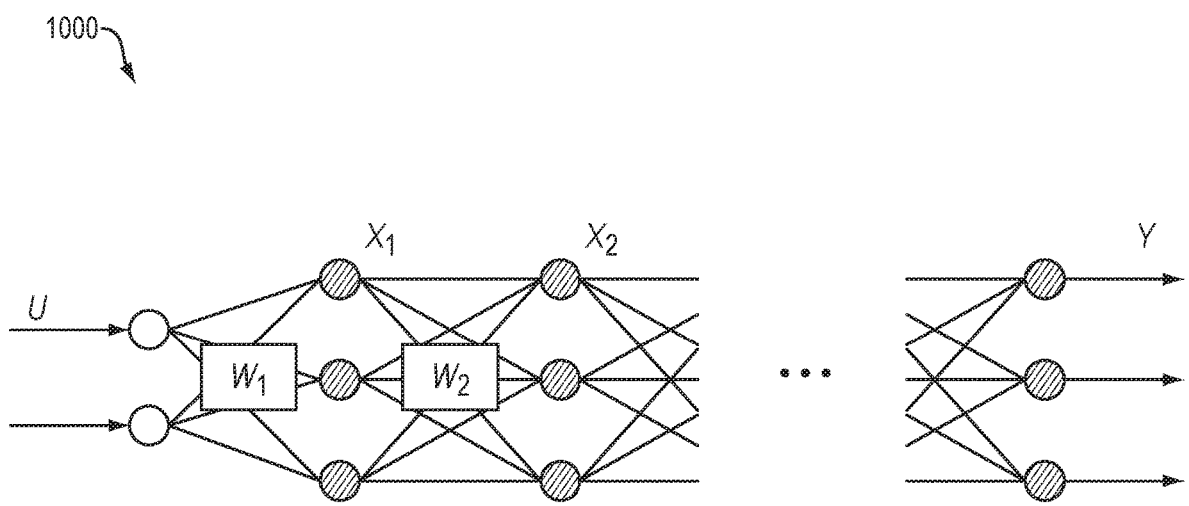
FIG. 10 is a diagram of an example neural network formed from connecting a number of the artificial neurons of FIG. 9 together.
Figure 11:
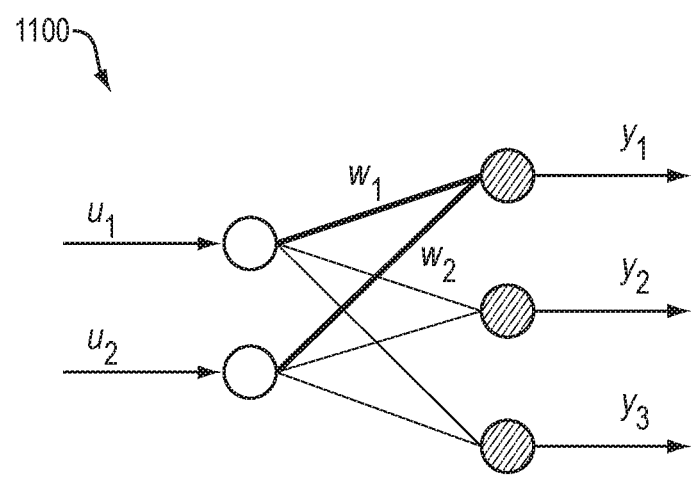
FIG. 11 is a diagram of the input layer and the first hidden layer of an example neural network.

FIG. 10 is a diagram 1000 of an example neural network formed from connecting a number of the artificial neurons of FIG. 9 together. In order to calculate a derivative of the entire neural network with multiple layers, an algorithm may be formulated for computing the derivative layer-by-layer. The algorithm may first focus on the top two layers, i.e. the input layer and the first hidden layer of the neural network. FIG. 11 is a diagram 1100 of the input layer and the first hidden layer of an example neural network. Focusing on this, $n_1$ and $m_1$ may be defined as the number of input and output, respectively. The model of these layers can be represented as:

$$y_i = h(W_{G(i)} \cdot U) = sig\left(W_{G(i)}^T \begin{bmatrix} 1 \\ U \end{bmatrix}\right) \quad (14)$$

Where $W_{G(i)}$ is vector weights, including bias, which is related to the $i^{th}$ output $y_i$, e.g., $W_{G(1)}=[b_1, w_1, w_2, \ldots, w_{n_1}]^T$ and U is the input vector, i.e, $U=[u_1, u_2, \ldots, u_{n_1}]^T$. By taking the derivative of the output vector $Y=[y_1, y_2, \ldots, y_{m_1}]^T$ with respect to the weight vector $W=[W_{G(1)}^T, W_{G(2)}^T, \ldots, W_{G(m_1)}]^T$, the Jacobian matrix $H_1$ for this neural network can be obtained as:

$$H_1 = \begin{bmatrix} \frac{\partial y_1}{\partial W_{G(1)}} & \frac{\partial y_1}{\partial W_{G(2)}} & \cdots & \frac{\partial y_1}{\partial W_{G(m_1)}} \\ \frac{\partial y_2}{\partial W_{G(1)}} & \frac{\partial y_2}{\partial W_{G(2)}} & \cdots & \frac{\partial y_2}{\partial W_{G(m_1)}} \\ \vdots & \vdots & \ddots & \vdots \\ \frac{\partial y_{m_1}}{\partial W_{G(1)}} & \frac{\partial y_{m_1}}{\partial W_{G(2)}} & \cdots & \frac{\partial y_{m_1}}{\partial W_{G(m_1)}} \end{bmatrix} = \quad (15)$$

$$\begin{bmatrix} sig'(z_1)[1 \cdot U^T] & 0 & \cdots & 0 \\ 0 & sig'(z_2)[1 \cdot U^T] & \cdots & 0 \\ \vdots & \vdots & \ddots & \vdots \\ 0 & 0 & \cdots & sig'(z_{m_1})[1 \cdot U^T] \end{bmatrix}$$

where sig' is the derivative of the sigmoid function sig(z), and can be calculated as:

$$sig'(z) = \frac{e^z}{(1+e^z)^2} \quad (16)$$

In equation (16), $\partial y_i / \partial W_{G(j)} = 0$ for $i \neq j$ because $W_{G(j)}$ is not the variable of the function $y_i = h(W_{G(i)}, U)$. Thus, $H_1$ is a block diagonal matrix.

By adding another hidden layer to the output of the neural network in FIG. 11, a neural network with one input layer and two hidden layers can be obtained. The model of the new neural network can be derived from the model in equation (14) by switching the weights $W_{G(i)}$ to the weights of the second hidden layer $W_{2,G(i)}$ and replacing the input U with the output of the first hidden layer. Because the output Y of the first hidden layer is not the output of the entire neural network in this new structure, but of the intermediate states, its notation is replaced by $X_1$. Supposing that there are $m_2$ neurons in the added hidden layer, the model of this new neural network can be constructed as:

$$y_1 = h(W_{2,G(i)} \cdot X_1) = sig\left(W_{2,G(i)}^T \begin{bmatrix} 1 \\ X_1 \end{bmatrix}\right) \quad (17)$$

$$X_1 = sig\left([W_{G(1)} W_{G(2)} \ldots W_{G(m_1)}]^T \begin{bmatrix} 1 \\ U \end{bmatrix}\right) \quad (18)$$

where $W_{2,G(i)}$ is a vector of weights and bias in the second hidden layer, which I related to the ith output $y_i$. The weight vector of the second hidden layer is defined by $W_2 = [W_{2,G(1)}^T, W_{2,G(2)}^T, \ldots, W_{2,G(m_2)}]^T$.

In this case, the matrix $H_2$ is the derivative of $Y=[y_1, y_2, \ldots, y_{m_2}]^T$ with respect of the weight vectors $W_1$ and $W_2$. By applying the chain rule to equation (17), the derivative of $y_i$ with respect to $W_1$ is:

$$\frac{\partial y_i}{\partial W_1} = sig'(z_{2,i}) \tilde{W}_{2,G(i)}^T \frac{\partial X_1}{\partial W_1} \tag{19}$$

where $\tilde{W}_{2,G(i)}$ is equal to the weight vector $W_{2,G(i)}$ but without the bias $b_i$. It is true that $$\frac{\partial X_1}{\partial W_1} = H_1$$

because $X_1$ is the output of the first hidden layer. On the other hand, the calculation of $$\frac{\partial y_1}{\partial W_2}$$

is the same as equation (15) by treating $X_1$ as the input. Therefore, the matrix $H_2$ for the two-layer neural network is:

$$H_2 = \frac{\partial Y}{\partial [W_1; W_2]} = \left[\frac{\partial Y}{W_1}, \frac{\partial Y}{W_2}\right] \tag{20}$$

where $\partial Y/\partial W_1$ can be computed according to equation (19) and $\partial Y/\partial W_2$ can be computed according to equation (15). The semicolon denotes vertical concatenation of matrices and vectors.

After $H_2$ for the two-layer neural network is obtained, new layers can be added. The proceeding calculation can be generalized to compute the H matrix of a neural network with an arbitrary number of layers. Supposing that $H_{k-1}$ is known for the (k−1)-layer neural network, the k-layer neural network is computed by $$H_k = \frac{\partial X_k}{\partial [W_1; \ldots ; W_{k-1}; W_k]} = \left[\frac{\partial X_k}{\partial [W_1; \ldots ; W_{k-1}]}, \frac{\partial X_k}{\partial W_k}\right] \tag{21}$$

$$\frac{\partial X_k}{\partial W_k} = \left[sig'(Z_k)[\tilde{W}_{k,G1}; \ldots ; \tilde{W}_{k,Gm_k}]^T H_{k-1} \cdot \frac{\partial X_k}{\partial W_k}\right]$$

where $Z_k = [z_{k,1}; z_{k,2}; \ldots ; z_{k,m_i}]$; $z_{k,i} = W_{k,G(i)}^T[1; X_{k-1}]$; and $$\frac{\partial X_k}{\partial W_k}$$

is a block diagonal calculated by:

$$\frac{\partial X_k}{\partial W_k} = \mathrm{Diag}\left(sig'(z_{k,1})[1, X_{k-1}^T], \ldots , sig'(z_{k,m_k})[1 \cdot X_{(k-1)}^T]\right). \tag{22}$$

Figure 12:
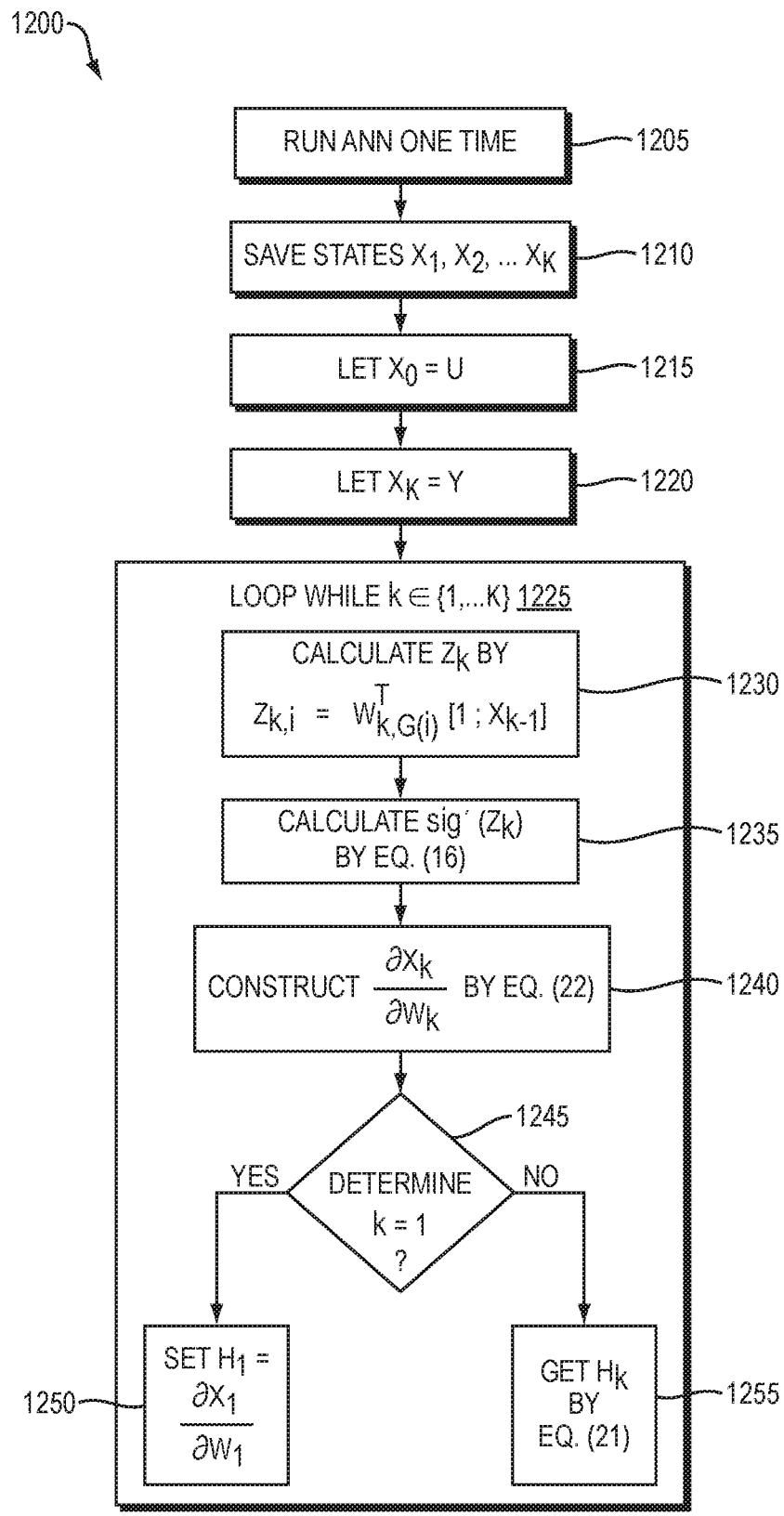
FIG. 12 is a flow diagram summarizing an example procedure that may be executed by the integrated deep learning framework to calculate the Jacobian matrix of a k-layer neural network $H_k$.

FIG. 12 is a flow diagram 1200 summarizing an example procedure that may be executed by the integrated deep learning framework 142 to calculate the Jacobian matrix of a k-layer neural network $H_k$. At step 1205, the ANN is executed one time. At step 1210, states $X_1, X_2, \ldots X_K$ are saved. At step 1215, $X_0$ is set to the input vector U. At step 1220, $X_K$ is set to the output Y. At step 1225, a loop is performed while the condition $k \in \{1, \ldots K\}$ is met. The loop contains sub-steps, including sub-step 1230 of calculating the matrix weighted sum of the inputs and bias $Z_k$ by $z_{k,i} = W_{k,G(1)}[1; K_{k-1}]$, sub-step 1235 of calculating $sig'(Z_k)$ by equation (16) above, and sub-step 1240 of constructing $$\frac{\partial X_k}{\partial W_k}$$

by equation (22) above, and conditional sub-step 1245. As part of conditional sub-step 1245 a determination is made whether k is equal to 1. If so, at further sub-step 1250 then $H_1$ is set equal to $$\frac{\partial X_1}{\partial W_1}.$$

If not, at further sub-step 1255 then $H_k$ is calculated by equation (21).

By adding all the layers of the neural network, the entire neural network can be constructed. That is, the matrix H of the entire neural network can be achieved by setting H equal to $H_k$, where K is the total number of hidden layers in the neural network.

It should be understood that various adaptations and modifications may be readily made to what is described above, to suit various implementations and environments. While it is discussed above that many aspects of the techniques may be implemented by specific software processes executing on specific hardware, it should be understood that some or all of the techniques may also be implemented by different software on different hardware. In addition to general-purpose computing devices/electronic devices, the hardware may include specially configured logic circuits and/or other types of hardware components. Above all, it should be understood that the above descriptions are meant to be taken only by way of example.

What is claimed is:

1. A method for training and updating a deep belief network (DBN) model for performing data analytics, comprising:
   receiving, in a user interface of an integrated deep learning framework executing on one or more electronic devices, input specifying at least a training dataset;
   training the DBN model using the training dataset, the training to include fine-tuning the DBN model using a recursively calculated Jacobian matrix that integrates an extended Kalman filter (EKF) to estimate operation parameters of the DBN model, the recursive calculations to include saving intermediate states, calculating a derivative of a sigmoid function of a matrix weighted sum of inputs and bias using the intermediate states, constructing a block diagonal matrix using the derivative of the sigmoid function and determining the Jacobian matrix based using the block diagonal matrix;
   applying, by the integrated deep learning framework, the DBN model to a current dataset to make predictions;
   assimilating data of the current dataset with the predictions using the EKF to update the DBN model; and
   displaying, in the user interface, an indication of the predictions for the current dataset.

2. The method of claim 1, wherein the fine-tuning further comprises:
providing a first portion of input data of the training dataset to the DBN model to produce predictions;
comparing the predictions to a first portion of output data of the training dataset with a comparison function to produce a difference;
feeding the difference to the EKF; and
using the EKF to adjust the operation parameters of the DBN model.

3. The method of claim 2, wherein the fine-tuning further comprises:
validating the DBN model using a second portion of input data of the training dataset.

4. The method of claim 3, further comprising
retraining the DBN model in successive rounds of training and validating until the DBN model exhibit a sign of being overfitted.

5. The method of claim 4, wherein the sign of being overfitted comprises a root-mean squared error (RMSE) produced in validation diverging from a RMSE of training.

6. The method of claim 1, wherein the fine-tuning further comprises computing a confidence interval that defines an upper and lower bound between which a prediction is expected to appear, and the applying further comprises ignoring any predictions that fall outside the confidence interval.

7. The method of claim 6 wherein the computing the confidence interval further comprises:
determining prediction covariance from an error covariance matrix used by the EKF.

8. The method of claim 6, wherein the assimilating further comprises:
updating the confidence interval using the current dataset.

9. The method of claim 1, further comprising:
optimizing configuration of the DBN model by using a genetic algorithm.

10. The method of claim 9, wherein the optimizing further comprises:
generating, by the genetic algorithm, a candidate DBN configuration and operation parameters;
using the candidate DBN configuration and operation parameters and the training dataset to train the DBN model;
treating, by the genetic algorithm, an error determined by a cost function used in the training as a fitness score;
repeating the generating, the using and the treating to produce subsequent candidate DBN configurations and operation parameters until the fitness score meets a threshold or another termination condition is met; and
using a final candidate DBN configuration and operation parameters for the DBN model.

11. The method of claim 10, wherein the genetic algorithm comprises a fast messy Genetic Algorithm (fmGA).

12. The method of claim 1, wherein the training dataset includes historical data captured from infrastructure-attached sensors describing the past condition of infrastructure and the current dataset includes data captured from infrastructure-attached sensors describing the current condition of the infrastructure.

13. A method for training a deep belief network (DBN) model for performing data analytics, comprising:
receiving, in a user interface of an integrated deep learning framework executing on one or more electronic devices, input specifying at least a training dataset;
generating, by a genetic algorithm, a candidate DBN configuration and operation parameters;
using the candidate DBN configuration and operation parameters and the training dataset to train the DBN model, the training to include recursively calculating a Jacobian matrix that integrates an extended Kalman filter (EKF) to estimate operation parameters of the DBN model;
treating, by the genetic algorithm, an error determined by a cost function used in the training as a fitness score;
repeating the generating, the using and the treating to produce subsequent candidate DBN configurations and operation parameters until the fitness score meets a threshold or another termination condition is met;
using a final candidate DBN configuration and operation parameters for the DBN model;
applying, by the integrated deep learning framework, the DBN model to a current dataset to make predictions; and
displaying, in the user interface, an indication of the predictions for the current dataset.

14. The method of claim 13, wherein the genetic algorithm comprises a fast messy Genetic Algorithm (fmGA).

15. The method of claim 13, further comprising
assimilating data of the current dataset with the predictions using the EKF to update the DBN model.

16. A non-transitory electronic device readable medium having instructions stored thereon that when executed by a processor of an electronic device are operable to:
train a deep belief network (DBN) model, the training to include fine-tuning the DBN model using a recursively calculated Jacobian matrix that integrates an extended Kalman filter (EKF) to estimate operation parameters of the DBN model, the recursive calculation to include saving intermediate states, calculating a derivative of a sigmoid function of a matrix weighted sum of inputs and bias using the intermediate states, constructing a block diagonal matrix using the derivative of the sigmoid function and determining the Jacobian matrix based using the block diagonal matrix;
apply the DBN model to a current dataset to make predictions;
assimilate data of the current dataset with the predictions using the EKF to update the DBN model; and
display an indication of the predictions for the current dataset.

17. The non-transitory electronic-device readable medium of claim 16, wherein the instructions to train further comprise instructions operable to:
provide a first portion of input data of the training dataset to the DBN model to produce predictions;
compare the predictions to a first portion of output data of the training dataset with a comparison function to produce a difference;
feed the difference to the EKF; and
use the EKF to adjust the operation parameters of the DBN model.

18. The non-transitory electronic-device readable medium of claim 16, wherein the instructions when executed are further operable to:
optimize configuration of the DBN model using a genetic algorithm.

19. The non-transitory electronic-device readable medium of claim 18, wherein the instructions to optimize further comprise instructions operable to:
generate a candidate DBN configuration and operation parameters;

use the candidate DBN configuration and operation parameters and the training dataset to train the DBN model;

treat an error determined by a cost function used in the training as a fitness score;

repeat operations to produce subsequent candidate DBN configurations and operation parameters until the fitness score meets a threshold or another termination condition is met; and use a final candidate DBN configuration and operation parameters for the DBN model.

20. The non-transitory electronic-device readable medium of claim 16, wherein the training dataset includes historical data captured from infrastructure-attached sensors describing the past condition of infrastructure and the current dataset includes data captured from infrastructure-attached sensors describing the current condition of the infrastructure.

\* \* \* \* \*